United States Patent
Yamamoto et al.

(10) Patent No.: US 7,120,993 B2
(45) Date of Patent: Oct. 17, 2006

(54) METHOD OF MANUFACTURING INSULATED COIL

(75) Inventors: Shigeyuki Yamamoto, Tokyo (JP); Wataru Bito, Tokyo (JP); Toshio Isooka, Tokyo (JP); Koichi Goshima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 354 days.

(21) Appl. No.: 10/862,583

(22) Filed: Jun. 8, 2004

(65) Prior Publication Data
US 2005/0097726 A1    May 12, 2005

(30) Foreign Application Priority Data
Jun. 11, 2003    (JP)    ............... 2003-166022

(51) Int. Cl.
H01F 7/06    (2006.01)
(52) U.S. Cl. ............ 29/606; 29/417; 29/592.1; 29/602.1; 29/605; 29/829; 29/831; 156/89.11; 156/89.12; 336/176; 336/200; 336/212; 336/229; 336/234; 427/117; 427/118; 427/119; 427/120
(58) Field of Classification Search ............... 29/417, 29/592.1, 602.1, 605, 606, 829, 831; 156/89.11, 156/89.12, 250; 336/176, 200, 229, 212, 336/234; 427/117–120
See application file for complete search history.

(56) References Cited

U.S. PATENT DOCUMENTS 4,286,010 A * 8/1981 Staley et al. ............... 428/215
4,554,730 A   11/1985 Westervelt et al.
4,806,806 A   2/1989 Hjortsberg et al.
6,140,590 A * 10/2000 Baumann et al. ....... 174/137 B
2002/0056569 A1   5/2002 Tsunoda et al.

FOREIGN PATENT DOCUMENTS

| JP | 02288308 A | * 11/1990 |
| JP | 11-206056 | 7/1999 |
| JP | 2002-374646 | 12/2002 |

OTHER PUBLICATIONS

"High-current density coils for high-radiation environments"; Harvey, A.; Magnetics, IEEE Transactions on vol. 17, issue 5; Sep. 1981 pp. 1717-1719.*

Brütsch et al, New High Voltage Insulation with Increased Thermal Conductivity, *EEIC/ICWA Conference in Chicago*, 1993, pp. 323-327.

* cited by examiner

*Primary Examiner*—Paul D. Kim
(74) *Attorney, Agent, or Firm*—Leydig, Voit & Mayer, Ltd.

(57) ABSTRACT

On a surface of a glass cloth adhered a mica layer sheet, a mixture of inorganic particles having a thermal conductivity of at least 5 W/mK, a resin, and a solvent is applied to form a layer of the mixture of the inorganic particles, the resin, and the solvent; the layer of the mixture is reduced in thickness using a doctor blade, followed by pressurizing to form a high thermally conducting layer; the mica layer sheet on which the high thermally conducting layer is disposed is cut to obtain a mica insulating tape; and the mica insulation tape is wound around a coil conductor. As a result, an insulated coil that is excellent in the voltage endurance characteristics and has a high thermal conductivity is manufactured.

4 Claims, 2 Drawing Sheets

METHOD OF MANUFACTURING INSULATED COIL

BACKGROUND OF THE INVENTION

1. Field of the Invention

The present invention relates to a method of manufacturing an insulation coil for use in an electric rotating machine, in particular, a method of manufacturing an insulation coil excellent in the insulating properties and the thermal conduction.

2. Description of the Related Art

In a high output electric rotating machine, it is necessary, in order to efficiently dissipate generated heat, to improve the thermal conductivity of an insulation coil. So far, it has been tried to use high thermal conduction insulating material in an electrically insulating coating of an insulation coil.

As a coil insulated with a high thermal conduction insulating material, there is a coil insulated with an insulating material that includes mica flake layers solidly fixed to glass fabric; and a resin layer that is disposed in a space between the mica flake layers and contains inorganic particles such as boron nitride, aluminum nitride, silicon nitride, aluminum oxide, magnesium oxide, beryllium oxide and silicon carbide that have the thermal conductivity of 5 W/mK or more, wherein at least 90% by weight of the inorganic particles is particles having a particle diameter in the range of 0.1 to 15 µm.

The coil insulated with an insulating layer that contains inorganic particles having high thermal conductivity in a resin layer disposed in a space between the mica flake layers is manufactured according to the respective methods below.

According to a first method, an insulation tape made of a mica flake layer fixed to glass fabric is wound around a coil conductor, and in the wound insulation tape a liquid resin containing inorganic particles having high thermal conductivity is impregnated.

Furthermore, according to a second method, an insulation tape that is made of a mica flake layer fixed to glass fabric and is not yet wound around a coil conductor is impregnated with a liquid resin containing inorganic particles having high thermal conductivity, the insulation tape impregnated with the resin is wound around a coil conductor.

Still furthermore, according to a third method, an insulation tape that is made of a mica flake layer fixed to glass fabric and not yet wound around a coil conductor is impregnated with a liquid resin, on a surface of the resin-impregnated insulation tape inorganic particles having high thermal conductivity are coated, and the inorganic particle-coated insulation tape is wound around a coil conductor (for instance, JP-A-63-110929).

Furthermore, according to a fourth method, on an insulation tape that is made of a mica flake layer fixed to glass fabric and not yet wound around a coil conductor, a liquid resin containing inorganic particles having high thermal conductivity is coated, and the inorganic particle containing resin-coated insulation tape is wound around a coil conductor (for instance, JP-A-11-206056).

The reason for the high thermal conduction insulation coil having the high thermal conduction is because in a space between mica flake layers fixed to glass fabric in an insulating layer, not only the glass fiber and the resin that are small in the thermal conductivity, but also inorganic particles having high thermal conductivity are present.

According to the first method of manufacturing an insulation coil, in order to allow sufficiently containing inorganic particles between the mica flake layers of the insulating layer, the inorganic particle-containing resin is necessary to be easily penetrated between the wound insulation tapes; accordingly, the insulation tape made of a mica flake layer is necessarily wound loose. Accordingly, according to the method of manufacturing an insulation coil, there are problems in that the insulation tape is wound around the coil conductor with difficulty, and a thickness of the insulating layer becomes uneven and thicker.

Furthermore, according to the second through fourth methods of manufacturing an insulation coil, there are problems in that the inorganic particle layer is formed thicker on the insulation tape, the inorganic particle layer between the mica flake layers becomes thicker, resulting in the insulating layer itself becoming thicker.

The voltage endurance characteristics of an insulation coil depends on a number of layers of mica layer in an insulating layer, that is, the larger the number of layers is, the more excellent the voltage endurance characteristics become. However, since the insulation coil is inserted in a slot groove of a stator of an electric rotating machine, a thickness of the insulating layer of the insulation coil is restricted. Accordingly, according to existing methods of manufacturing an insulation coil, there are problems in that the insulation tape becomes thicker, the number of layers of mica layer in the insulating layer becomes smaller, and deterioration of the voltage endurance characteristics results.

SUMMARY OF THE INVENTION

The present invention is achieved to overcome the above problems and an object thereof is to provide a method of manufacturing an insulation coil that is excellent in the voltage endurance characteristics and has high thermal conduction by enabling to form a layer of inorganic particle between mica flake layers without increasing a thickness of the insulating layer.

A method of manufacturing an insulation coil according to the present invention includes: a step of stacking a mica layer sheet to which a resin is stuck and glass cloth to which a resin is stuck followed by pressurizing to obtain a mica layer sheet to which the glass cloth is stuck; a step of coating, on a surface to which the glass cloth is stuck of the mica layer sheet to which the glass cloth is stuck, a mixture of inorganic particles having the thermal conductivity of 5 W/mK or more, a resin and a solvent to form a layer of mixture of the inorganic particles, the resin and the solvent; a step of cutting the layer of mixture with a doctor blade followed by pressurizing; a step of volatilizing the solvent in the cut and pressurized layer of mixture to dispose a thermally conductive layer containing the inorganic particles having the thermal conductivity of 5 W/mK or more on a surface to which the glass cloth is stuck of the mica layer sheet; a step of cutting the mica layer sheet on which the thermally conductive layer is disposed to obtain a mica insulation tape provided with the thermally conductive layer on a surface to which the glass cloth is stuck; and a step of winding the mica insulation tape around a coil conductor.

Therefor, by the method of manufacturing the insulation coil according to the invention, the layer of inorganic particle can be formed between the mica flake layers without increasing a thickness of the insulating layer, and then the insulation coil that is excellent in the voltage endurance characteristics and has high thermal conduction can be obtained.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1A:
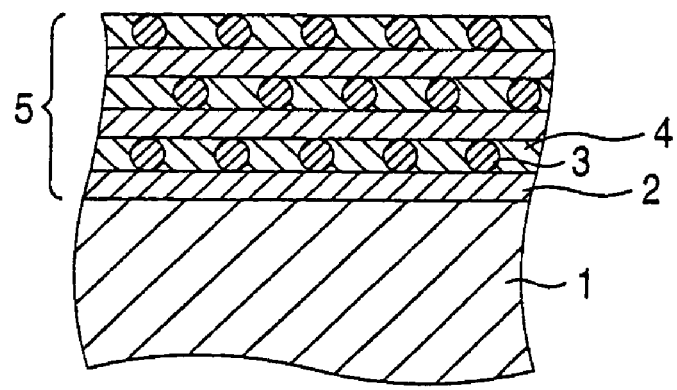
FIGS. 1A and 1B are diagrams for explaining an effect of an insulation coil obtained according to a manufacturing method according to embodiment 1, FIG. 1A showing a configuration (a) of an insulating layer manufactured according to a method in which a cutting process of a layer of mixture is contained, FIG. 1B showing a configuration (b) of an insulating layer manufactured according to a method in which a cutting process of a layer of mixture is not contained.

A method of manufacturing an insulation coil in an embodiment 1 according to the invention includes the respective steps below.

On a mica sheet obtained by paper making reconstituted mica dispersed in water with a paper machine, a resin dissolved in a solvent is coated by means of a roll coater method or a spray method followed by volatilizing the solvent, and thereby a resin-stuck mica layer sheet is obtained.

Furthermore, on glass cloth that is a reinforcement of the mica layer sheet, a resin dissolved in a solvent is coated by means of a roll coater method or a spray method followed by volatilizing the solvent, and thereby resin-stuck glass cloth is obtained.

In the next place, the resin-stuck mica layer sheet and the resin-stuck glass cloth are stacked, heated under pressure by undergoing a heat roller at a temperature of 60 to 70 degree centigrade to stick the glass cloth that is a reinforcement to the mica layer sheet, and thereby a mica layer sheet reinforced with the glass cloth is obtained.

Subsequently, a mixture of inorganic particles having the thermal conductivity of 5 W/mK or more, a resin and a solvent is coated, by means of a spray method, a roll coater method or a gravure transfer method, on a surface on which the glass cloth is stuck of the glass cloth reinforced-mica layer sheet, and thereby a layer of the mixture of the inorganic particles, the resin and the solvent is formed.

In the next place, a portion of superfluous thickness of the layer of mixture is cut by use of a doctor blade, pressurized by use of a heat roller and thereby a thickness of the layer of mixture is leveled, followed by volatilizing the solvent, and thereby a mica layer sheet provided with a thermally conductive layer made of inorganic particles having the thermal conductivity of 5 W/mK or more is obtained.

Subsequently, the mica layer sheet provided with the thermally conductive layer is cut in, for instance, a width of 18 to 32 mm, and thereby a mica insulation tape provided with the thermally conductive layer is obtained.

Next, the mica insulation tape is wound a predetermined number of times by half overlap winding around a coil conductor that is previously treated so as to be isolated between strands, and thereby an insulating layer is formed.

Then, the insulating layer is impregnated with a thermo setting liquid resin, clamped with a predetermined mold, heated in a curing furnace to cure the impregnated thermosetting liquid resin, and thereby an insulation coil is manufactured.

In the present embodiment, as the resin that is used in each of the mica layer sheet, the reinforcement and the layer of the mixture of inorganic particles and resin, an epoxy resin, an unsaturated polyester resin, a phenolic resin and the like can be cited. Among these, the epoxy resin, being particularly excellent in the heat resistance and the mechanical strength, is most preferably used.

Furthermore, as the thermosetting resin impregnated in the insulating layer of the coil, a solvent-free low viscosity epoxy resin or an unsaturated polyester resin can be cited.

In the embodiment, as the inorganic particles having the thermal conductivity of 5 W/mK or more, boron nitride, aluminum nitride, silicon nitride, aluminum oxide, magnesium oxide beryllium oxide and silicon carbide can be cited. These inorganic particles may be used in one kind or in combinations of a plurality of kinds.

In the embodiment, as the glass cloth for use in the reinforcement, one having a open area ratio (ratio of gap per unit area) of 80 to 98% is used. When the open area ratio is larger than 98%, since the fiber becomes slight and an effect of reinforcing the mica layer sheet becomes smaller, in winding as an insulation tape, in some cases, it may be disconnected. Furthermore, when the open area ratio is less than 80%, an amount of the inorganic particles that have the thermal conductivity of 5 W/mK or more and are filled in a portion of openings (gaps) of the glass cloth becomes slight, the thermal conductivity of the thermally conductive layer is deteriorated, resulting in deteriorating the heat conduction of the insulation coil.

In the embodiment, a material of the doctor blade that is used to cut and remove a portion of superfluous thickness of the layer of mixture, metal, ceramics and plastics can be cited. Among these, from viewpoints, in particular, of the workability in forming a doctor blade and the wear resistance when the layer of mixture is cut, chrome plated steel is preferable.

In the embodiment, conditions of cutting a portion of superfluous thickness of the layer of mixture are as follows. That is, a gap of the doctor blade that is defined as a clearance between the mica layer sheet to which the glass cloth on which the layer of mixture is not yet coated is stuck and the doctor blade is 0.01 to 0.1 mm and a cutting temperature is 10 to 40 degree centigrade. Furthermore, a cutting speed that is defined as a running speed of the mica layer sheet to the doctor blade is 5 m/min or less.

When the cutting temperature is less than 10 degree centigrade, the viscosity of the layer of mixture becomes too high to be capable of evenly cutting; on the other hand, when it is higher than 40 degree centigrade, since the solvent in the layer of mixture volatilizes much and the variation with time of the viscosity of the layer of mixture during cutting is large, the cutting to a uniform thickness cannot be attained.

When the gap of the doctor blade is less than 0.01 mm, the doctor blade comes into strong contact with the glass cloth as the reinforcement and in some cases the glass cloth peels off the mica layer sheet; on the other hand, when it is larger than 0.1 mm, a thickness of the layer of mixture in the insulation tape becomes thicker, resulting in a thicker insulating layer.

When the cutting speed is 5 m/min or less, though the characteristics of the obtained insulation tape is not affected, since the lower cutting speed necessitates a longer time for manufacturing a mica layer sheet provided with a highly thermally conductive layer and thereby the productivity of the insulation tape is decreased, the cutting speed is particularly preferably in the range of 1 to 5 m/min. When the cutting speed is larger than 5 m/min, in some cases, the layer of mixture filled in a portion of opening (gap) of the glass cloth is also removed, resulting in a non-uniform thickness of the insulation tape.

Figure 1B:
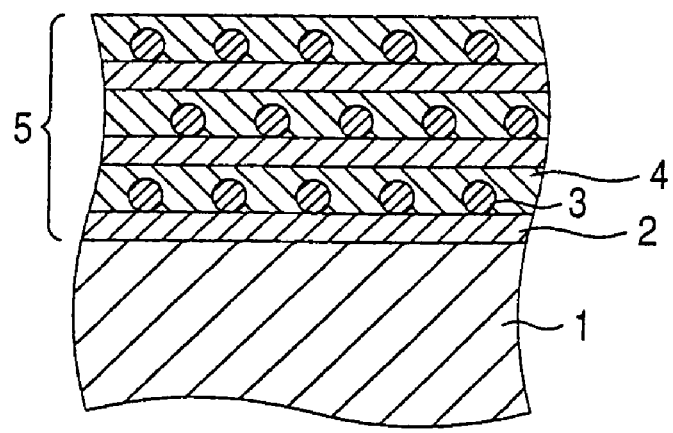

FIGS. 1A and 1B are diagrams for explaining an effect of an insulation coil obtained according to a manufacturing method according to embodiment 1. FIG. 1A shows a configuration (a) of an insulating layer manufactured according to a method in which a cutting process of the layer of mixture is contained and FIG. 1B shows a configuration (b) of an insulating layer manufactured according to a method in which a cutting process is not contained.

An insulating layer 5 is constituted by alternately laminating, from a coil conductor 1 side, a mica layer 2, glass cloth 3 that is a reinforcement in contact with the mica layer 2, and a thermally conductive layer 4.

In an insulating layer 5 manufactured according to a conventional method in which the cutting process of the layer of mixture is not contained, the thermally conductive layer 4 is present in openings (gaps) of the glass cloth 3 and on a surface of the glass cloth 3.

On the other hand, in an insulating layer 5 manufactured according to a method according to the present embodiment in which the cutting process of the layer of mixture is contained, since the thermally conductive layer 4 is present mainly only in openings (gaps) of the glass cloth 3 that is the reinforcement, the insulation tape becomes thinner, resulting in thinning the insulating layer 5 having the same number of layers.

The insulation coil is inserted in a slot groove of a stator of an electric rotating machine. Since a thickness of the insulation tape manufactured according to the method according to the embodiment is thinner than that of the insulation tape manufactured according to the conventional method, in the case of the embodiment being applied to an insulation coil that is inserted in a slot groove having the same width, the number of turns of the insulation tape can be increased, the number of mica layers in the insulating layer can be increased, resulting in improving the voltage endurance characteristics of the insulation coil.

Figure 2A:
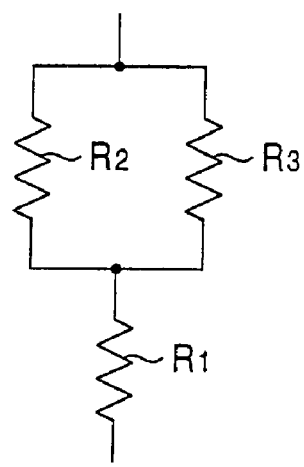
FIGS. 2A and 2B are thermal resistance diagrams of one layer of an insulation tape, FIG. 2A being that of a configuration (a) of an insulating layer manufactured according to a method that contains a cutting process of a layer of mixture, FIG. 2B being that of a configuration (b) of an insulating layer manufactured according to a method that does not contain a cutting process of a layer of mixture.
Figure 2B:
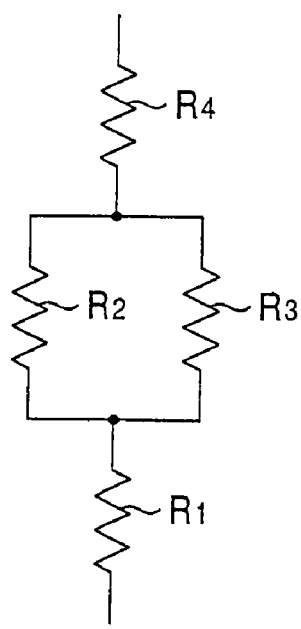

Furthermore, in the case of the thermal resistance of the mica layer 2, that of the glass cloth 3, that of the thermally conductive layer 4 filled in the opening (gap) of the glass cloth 3 and that of the thermally conductive layer 4 on a surface of the glass cloth 3, respectively, being taken as $R_1$, $R_2$, $R_3$ and $R_4$, thermal resistance diagrams of one layer of insulation tape in a configuration (FIG. 2A) of an insulating layer manufactured according to a method that contains the cutting process of the layer of mixture and in a configuration (FIG. 2B) of an insulating layer manufactured according to a method that does not contain the cutting process of the layer of mixture are shown in FIGS. 2A and 2B.

As obvious from FIGS. 2A and 2B, in comparison with the insulation tape manufactured according to the conventional method that does not contain the cutting process of the layer of mixture, the insulation tape manufactured according to a method according to the embodiment is smaller by $R_4$ in the thermal resistance, that is, the thermal conduction is superior. In particular, since the insulating layer 5 is formed by winding an insulation tape a plurality of times, the difference of the thermal conduction between the insulating layers becomes further larger. That is, an insulation coil further superior in the thermal conduction to an insulation coil manufactured according to the conventional method can be obtained.

EXAMPLE

In what follows, the present invention will be detailed with examples.

Example 1

Reconstituted mica powder is dispersed in water, the dispersion solution is subjected to paper making by use of a paper machine and thereby a reconstituted mica foil is prepared. On the reconstituted mica foil, a resin composition in which 100 parts by weight of bisphenol A epoxy resin (product name: Epikote 834, manufactured by Japan Epoxy Resin Co., Ltd.) and 10 parts by weight of zinc naphthenate are dissolved in 400 parts by weight of methyl ethyl ketone is coated by use of a roll coater method and at the same time the reconstituted mica foil is laminated on a polyester film having a width of 1000 mm, a thickness of 0.02 mm and a predetermined length that is a tentative support, and thereby a mica layer sheet having a finished thickness of the mica layer of 0.1 mm is prepared.

A resin composition that is prepared by blending 100 parts by weight of bisphenol A epoxy resin (product name: Epikote 834, manufactured by Japan Epoxy Resin Co., Ltd.), 10 parts by weight of zinc naphthenate and 1000 parts by weight of methyl ethyl ketone is coated by use of a roll coater method on glass cloth that is a reinforcement and has a width of 1000 mm, a thickness of 0.03 mm, a predetermined length and a open area ratio of 97% followed by volatilizing a solvent, and thereby a resin stuck glass cloth sheet is prepared.

In the next place, on a mica layer surface of the mica layer sheet, the resin stuck glass cloth sheet is laminated. Thus laminated one is pressurized with a heat roll at 60 degree centigrade, and the resin stuck glass cloth sheet is pressure bonded to the mica layer sheet.

One hundred and fifty parts by weight of bisphenol A epoxy resin (product name: Epikote 834, manufactured by Japan Epoxy Resin Co., Ltd.), 15 parts by weight of zinc naphthenate, 220 parts by weight of boron nitride powder having an average particle diameter of 5 μm (product name: HP-6G, manufactured by Mizushima Ferroalloy Co., Ltd.) and 1000 parts by weight of methyl ethyl ketone are blended, and thereby a slurry of boron nitride powder is prepared.

The slurry is coated on the glass cloth sheet surface in a laminate of the mica layer sheet and the glass cloth sheet, and thereby a layer of mixture containing boron nitride powder is formed.

In the next place, the layer of mixture is cut by use of a doctor blade made of chrome-plated steel under the conditions of a gap adjusted to 0.01 mm, a cutting speed of 3 m/min, and 25 degree centigrade. Thereafter, a solvent present in the layer of mixture is volatilized followed by pressurizing with a heat roll at 60 degree centigrade, and thereby an insulating material sheet including a polyester film, a mica layer sheet, a glass cloth sheet and a thermally conductive layer is obtained. The insulating material sheet is cut in a width of 30 mm to form an insulation tape.

Subsequently, an insulation tape from which a polyester film is removed is wound by half overlap winding around a test bar of 50×12×1140 mm with a surface of the mica layer sheet directed toward the test bar (conductor), and thereby an insulation sheath is formed. Furthermore, the insulation sheath made of the insulation tape is impregnated with an impregnation resin including bisphenol A epoxy resin (product name: Epikote 828, manufactured by Japan Epoxy Resin Co., Ltd.) and methyltetrahydro phthalic anhydride (product name: HN-2200, manufactured by Hitachi Chemical Co., Ltd.) as a hardener. The insulation sheath is clamped with a jig so as to be 4.26 mm in an insulation thickness, heated in a drying furnace to cure the resin, and thereby an insulation coil for use in test is prepared.

In the next place, the thermal conductivity and the voltage endurance characteristics of an insulating layer of the obtained test insulation coil were evaluated. With a test specimen cut out of the insulating layer of the test insulation coil, the thermal conductivity of the insulating layer was measured by use of thermal conductivity measuring apparatus (manufactured by Miki Science System, model: TXP-03).

The voltage endurance characteristics, also with a test specimen cut out of the insulating layer of the test insulation coil, were obtained from a voltage when a voltage was applied by step-by-step method at 25 degree centigrade and the dielectric breakdown was caused.

Obtained thermal conductivities and voltage endurance characteristics ate shown in Table 1.

Example 2

With the exception that the layer of mixture was cut with the gap of the doctor blade set at 0.1 mm, similarly to example 1, a model insulation coil was prepared. The thermal conductivity and the voltage endurance characteristics of the insulating layer of the obtained model insulation coil were obtained similarly to example 1 and measurements are shown in Table 1.

Examples 3 and 4

With the exception that a temperature at cutting the layer of mixture was set at 10 degree centigrade (example 3) or 40 degree centigrade (example 4), similarly to example 1, model insulation coils were prepared. The thermal conductivities and the voltage endurance characteristics of the insulating layers of the obtained model insulation coils were obtained similarly to example 1 and measurements are shown in Table 1.

Example 5

With the exception that a cutting speed of the layer of mixture was set at 5 m/min, similarly to example 1, a model insulation coil was prepared. The thermal conductivity and the voltage endurance characteristics of the insulating layer of the obtained model insulation coil were obtained similarly to example 1 and measurements are shown in Table 1.

Examples 6 and 7

With the exception that as glass cloth as the reinforcement, one having the open area ratio of. 80% (example 6) or 98% (example 7) was used, similarly to example 1, model insulation coils were prepared. The thermal conductivities and the voltage endurance characteristics of the insulating layers of the obtained model insulation coils were obtained similarly to example 1 and measurements are shown in Table 1.

Comparative Example 1

With the exception that the cutting of the formed layer of mixture and the pressurization thereof at 60 degree centigrade by use of a heat roll were not applied, similarly to example 1, a model insulation coil was prepared. The thermal conductivity and the voltage endurance characteristics of the insulating layer of the obtained model insulation coil were obtained similarly to example 1 and measurements are shown in Table 1.

Comparative Examples 2 and 3

With the exception that the layers of mixture were cut with the gap of the doctor blade set at 0.008 mm (comparative example 2) or 0.11 mm (comparative example 3), similarly to example 1, model insulation coils were prepared. The thermal conductivities and the voltage endurance characteristics of the insulating layers in the obtained model insulation coils were obtained similarly to example 1 and measurements are shown in Table 1.

Comparative Examples 4 and 5

With the exception that a temperature when the layer of mixture was cut was set at 8 degree centigrade (comparative example 4) or 43 degree centigrade (comparative example 5), similarly to example 1, model insulation coils were prepared. The thermal conductivities and the voltage endurance characteristics of the insulating layers of the obtained model insulation coils were obtained similarly to example 1 and measurements are shown in Table 1.

Comparative Example 6

With the exception that the cutting speed of the layer of mixture was set at 5.1 m/min, similarly to example 1, a model insulation coil was prepared. The thermal conductivity and the voltage endurance characteristics of the insulating layer of the obtained model insulation coil were obtained similarly to example 1 and measurements are shown in Table 1.

Comparative Examples 7 and 8

With the exception that as the glass cloth as reinforcement, one having the open area ratio of 78% (comparative example 7) or 99% (comparative example 8) was used, similarly to example 1, model insulation coils were prepared. The thermal conductivities and the voltage endurance characteristics of the insulating layers of the obtained model insulation coils were obtained similarly to example 1 and measurements are shown in Table 1.

As shown in Table 1, the insulation coils obtained according to manufacturing methods of the invention according to examples 1 through 7 have the thermal conductivities and the voltage endurance characteristics superior to that of the insulation coils obtained according to the method of comparative example 1 where the cutting of the layer of mixture and the pressurization thereof after the cutting were not applied.

In comparative example 2 where the cutting was applied with the gap of the doctor blade set at less than 0.01 mm, the glass cloth partially peeled off the mica layer sheet, resulting in being incapable of obtaining an excellent insulation tape. Furthermore, in comparative example 3 where the cutting was applied with the gap of the doctor blade set at more than 0.1 mm, the thermally conductive layer became thicker than a thickness of the glass cloth, a thickness of the insulation tape became thicker, resulting in deterioration of the thermal conductivity and the voltage endurance characteristics of the insulation coil.

In comparative example 4 where a temperature at the cutting was set at less than 10 degree centigrade, the viscosity of the layer of mixture became higher, the layer of mixture filled in the openings (gaps) of the glass cloth was also removed by cutting, a thickness of the insulation tape became uneven, voids were formed in the insulating layer formed from the insulation tape, as a result, the thermal conductivities and the voltage endurance characteristics of the insulation coil were deteriorated largely. In comparative example 5 where the cutting was carried at a temperature higher than 40 degree centigrade, the solvent in the layer of mixture volatilized much, the viscosity in the layer of mixture increased; as a result, similarly to the comparative example 4, the thermal conductivity and the voltage endurance characteristics of the insulation coil were deteriorated largely.

In comparative example 6 where the layer of mixture was cut at the cutting speed larger than 5 m/min, the layer of mixture filled in the openings (gaps) of the glass cloth was also removed, an insulation tape having a uniform thickness was not formed, voids were formed in the insulating layer formed from the insulation tape; as a result, the thermal conductivity and the voltage endurance characteristics of the insulation coil were deteriorated largely.

In the insulation coil according to comparative example 7 where the glass cloth having the open area ratio less than 80% was used, since the thermally conductive layer filled in the gaps of the glass cloth was scarce, the thermal conductivity of the insulating layer was deteriorated. In comparative example 8 where the glass cloth having the open area ratio more than 98% was used, since, in some cases, the insulation tape is broken at the time of winding the insulation tape, an insulation coil could not be obtained.

According to the methods of manufacturing an insulation coil of the invention according to examples 1 through 7, at the time of cutting, the layer of mixture filled in the openings (gaps) of the glass cloth was not removed, furthermore, the insulation tape did not become thicker, at the time of cutting the glass cloth did not peel off the mica layer sheet, that is, an insulation coil excellent in the thermal conductivity and the voltage endurance characteristics could be obtained.

TABLE 1

|  | Thermal conductivity (W/mK) | Voltage endurance characteristics (Kv/mm) | Manufacturability of insulation |
|---|---|---|---|
| Example 1 | 0.51 | 26.3 | OK |
| Example 2 | 0.49 | 25.5 | OK |
| Example 3 | 0.50 | 25.9 | OK |
| Example 4 | 0.52 | 26.5 | OK |
| Example 5 | 0.51 | 26.3 | OK |
| Example 6 | 0.46 | 25.2 | OK |
| Example 7 | 0.54 | 26.4 | OK |
| Comparative example 1 | 0.29 | 18.8 | OK |
| Comparative example 2 | — | — | NO (peeling of glass cloth) |
| Comparative example 3 | 0.35 | 21.7 | OK |
| Comparative example 4 | 0.30 | 19.9 | OK |
| Comparative example 5 | 0.31 | 20.5 | OK |
| Comparative example 6 | 0.36 | 22.0 | OK |
| Comparative example 7 | 0.32 | 25.7 | OK |
| Comparative example 8 | — | — | NO (breaking of insulation tape) |

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A method of manufacturing an insulated coil comprising:
    stacking a mica layer sheet to which a resin is adhered and glass cloth to which a resin is adhered, followed by pressurizing to obtain the mica layer sheet to which the glass cloth is adhered;
    applying a coating, to a surface of the glass cloth adhered to the mica layer sheet, of a mixture of inorganic particles having a thermal conductivity of at least 5 W/mK, a resins, and a solvent to form a layer of the mixture of the inorganic particles, the resin, and the solvent;
    reducing thickness of the layer of the mixture with a doctor blade, followed by pressurizing;
    volatilizing the solvent in the layer of the mixture to leave a thermally conductive layer containing the inorganic particles on the surface of the glass cloth adhered to the mica layer sheet;
    cutting the mica layer sheet to which the thermally conductive layer is attached to obtain a mica insulating tape with the thermally conductive layer on the surface of the glass cloth; and
    winding the mica insulating tape around a coil conductor.

2. The method of manufacturing an insulated coil according to claim 1, wherein a gap of the doctor blade when the layer of mixture is reduced in thickness is in a range of 0.01 mm to 0.1 mm.

3. The method of manufacturing an insulated coil according to claim 1, wherein speed of the mica layer sheet relative to the doctor blade when reducing the thickness of the layer of the mixture does not exceed 5 m/min.

4. The method of manufacturing an insulated coil according to claim 1, wherein the glass cloth has an open area ratio in a range of 80% to 98%.

* * * * *